May 6, 1941. G. W. SCHATZMAN 2,241,043
FENDER SHIELD AND MOUNTING MEANS THEREFOR
Filed May 5, 1939 3 Sheets-Sheet 1
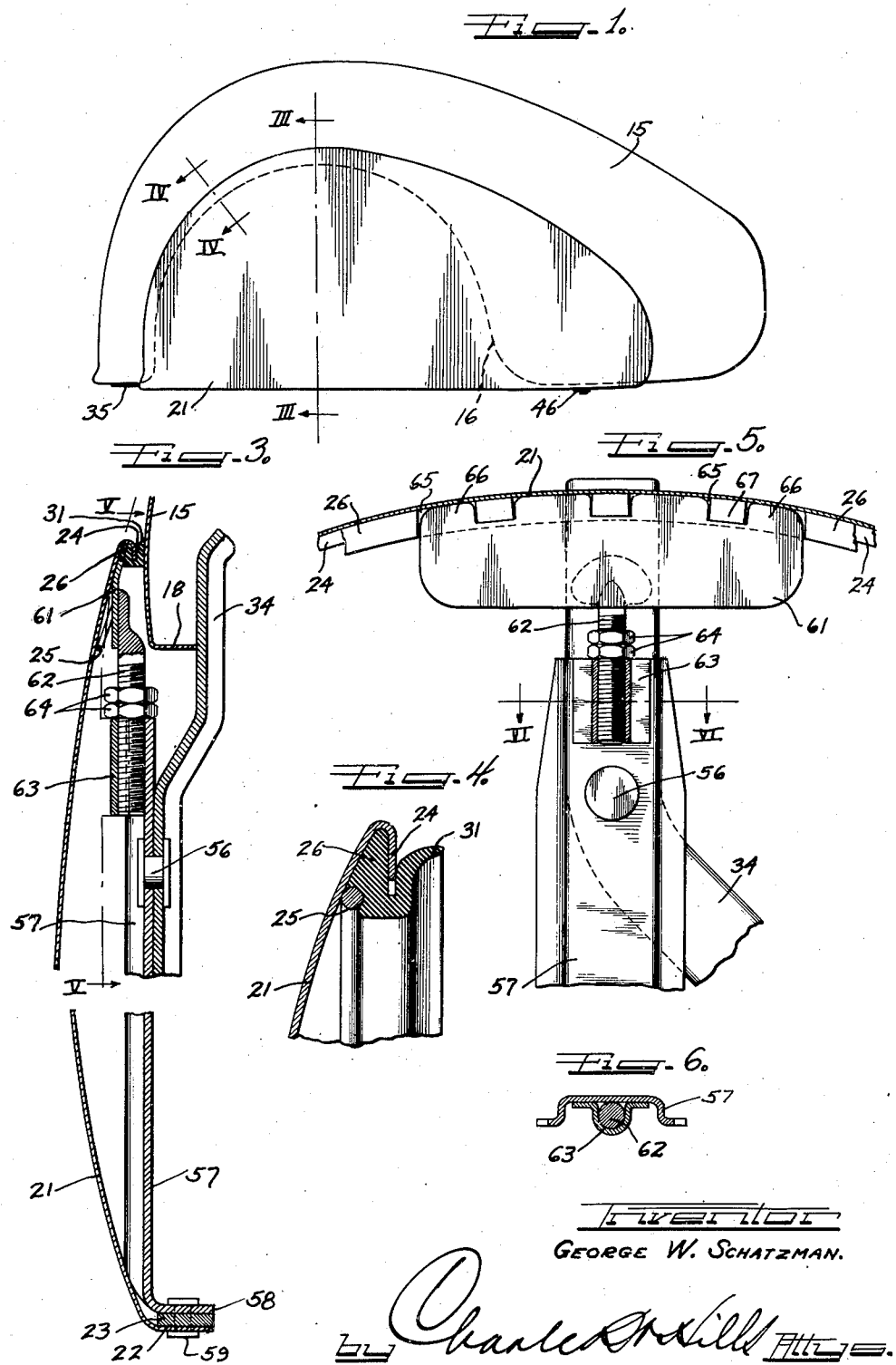

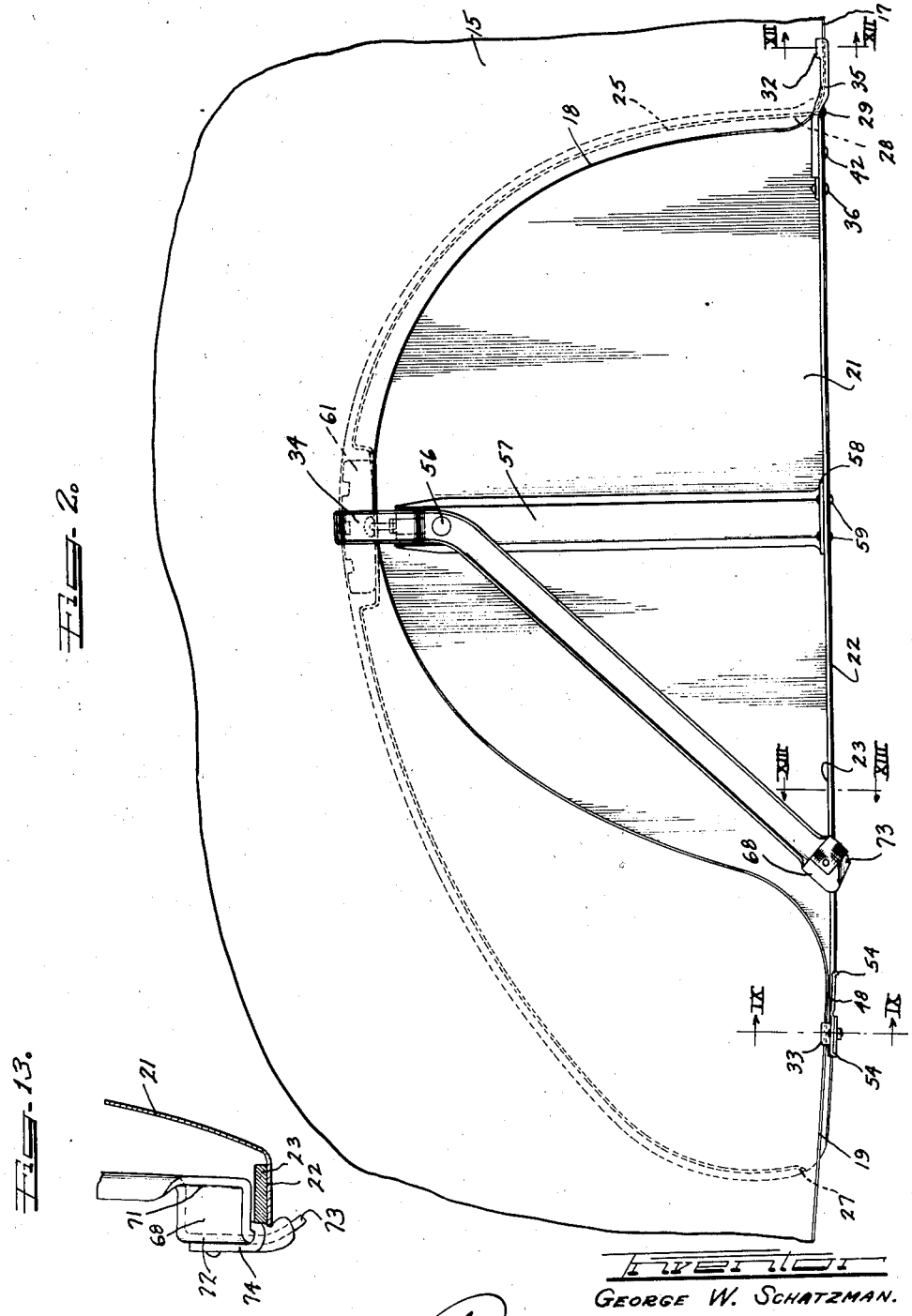

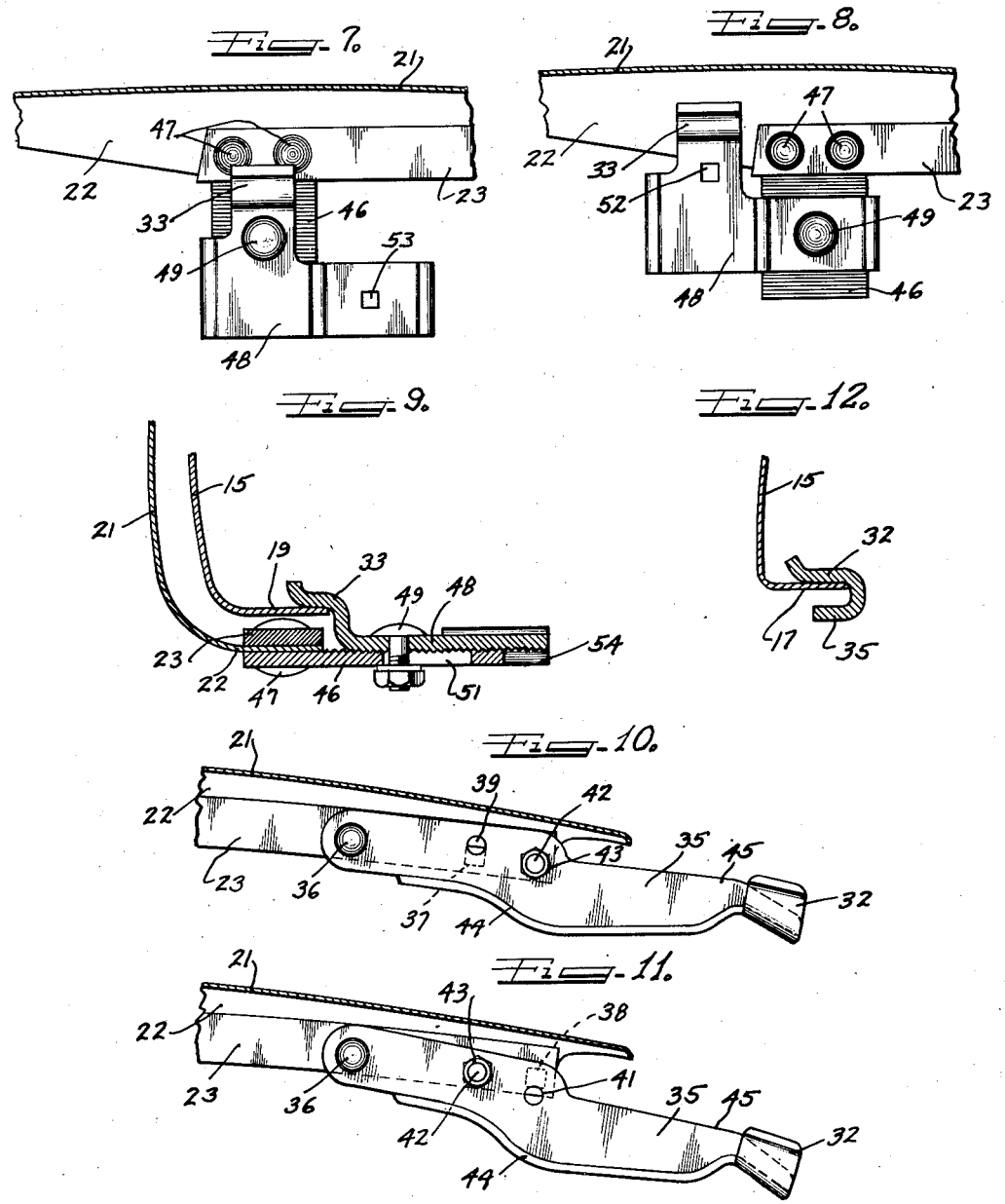

Patented May 6, 1941

2,241,043

UNITED STATES PATENT OFFICE 2,241,043

FENDER SHIELD AND MOUNTING MEANS THEREFOR

George W. Schatzman, Detroit, Mich., assignor to Houdaille-Hershey Corporation, Detroit, Mich., a corporation of Michigan Application May 5, 1939, Serial No. 271,915

9 Claims. (Cl. 280—153)

This invention relates to means for covering or closing the wheel access opening in the fender of a vehicle or in other types of wheel enclosures. In particular my invention relates to "fender shields" or "fender skirts," as such devices are known when used in connection with a fender, but this invention is equally applicable to automotive vehicles having a body wide enough to enclose the wheel without the use of fenders, and in which the wheel access openings are in the sides of the body itself. Bodies having such a width are to be found today only among commercial vehicles, but I wish it to be expressly understood that this invention is equally applicable to such bodies on commercial vehicles and also on private vehicles, if at some time in the future such bodies should come into use on private vehicles. Therefore while I have referred to my invention as a fender shield, it is to be clearly understood that this term includes covers for wheel access openings in the side of a body or other wheel enclosing member as well as for wheel access openings in fenders.

In designing ornamental fender shields or skirts of the type which is adapted to cover the usual wheel access opening in a vehicle fender or body, it is important that the means which is employed to secure the fender shield in desired position be simple and quick to operate both in assembling the fender shield on the vehicle fender and in removing it therefrom. It must also possess a considerable degree of ruggedness when in use and be substantially free from vibration and noise.

It is an object of this invention to provide a novel ornamental fender shield which possesses the above highly desirable characteristics.

Another object of this invention is to provide a fender shield having a panel of which no portion fits within the wheel access opening and against the edge of the fender, thus making the fit of the fender shield independent of the exact size of the wheel access opening and making possible the use of the same fender shield panel on different fenders of the same general contour merely by changing the adjustment of the fender shield panel supporting means. In order to permit this to be readily done, it is a further object of this invention to provide adjustable fender shield supporting means which can be readily secured in various positions in order to properly support a standard fender shield panel on any one of several different fenders.

Another object of this invention is to provide a fender shield supporting means which includes adjustable hooks near each end of the lower edge of the fender shield and adapted to engage the underturned edge of a fender to support the fender shield and hold its lower portion in against the side of the fender.

Another object of this invention is to provide a fender shield having a panel whose edge is adapted to be held in tightly against the side of a fender by being secured to the fender at each end of its lower edge and at a point near the top and in which the securing means at the point near the top of the fender shield panel is free to swing slightly about a vertical axis with respect to the fender shield panel in order to permit the edge of the fender shield to adjust itself more freely to the shape of the side of the fender.

Another object of this invention is to provide a latch near the top of a fender shield and having an arm extending down obliquely to the lower edge of the fender shield, the end of the arm being arranged to resiliently embrace an inturned lower edge on the fender shield panel in order to hold the latch in position.

The novel features which I believe to be characteristic of my invention are set forth with particularity in the appended claims. My invention itself, however, both as to its organization and manner of construction, together with further objects and advantages thereof, may best be understood by reference to the following description, taken in connection with the accompanying drawings, in which:

Figure 1 is a side elevation of one of the preferred forms of my invention as it appears when mounted on a fender;

Figure 2 (on the second sheet of drawings) is a side elevation of the form of the invention shown in Figure 1 as seen from the inside of the fender;

Figure 3 is a vertical cross-sectional view taken on the line III—III of Figure 1 and looking in the direction of the arrows;

Figure 4 is a cross-sectional view through the edge of the fender shield taken on the line IV—IV of Figure 1 and looking in the direction of the arrows;

Figure 5 is a view, partly in section, of the upper portion of the latch mechanism and its attachment to the fender shield panel, the view being taken from the line V—V in Figure 3 and looking in the direction of the arrows;

Figure 6 is a cross section through the portion of the device shown in Figure 5, taken on the line VI—VI and looking down in the direction of the arrows;

Figure 7 is a plan view of the fender shield support seen at the lower left of Figure 2;

Figure 8 is a view similar to Figure 7 but showing the parts adjusted to fit a different fender;

Figure 9 is a cross section through the attaching means shown in Figure 7 and through the cooperating edge of the fender, the section being taken on the line IX—IX of Figure 2 and looking in the direction of the arrows;

Figure 10 is a plan view of the fender shield support seen at the lower right of Figure 2;

Figure 11 is a plan view similar of Figure 10 but showing the support adjusted differently to fit a different fender;

Figure 12 is a cross-sectional view through the hook at the end of support shown in Figures 10 and 11 and through the edge of the fender with which it cooperates, the section being taken on the line XII—XII of Figure 2 and looking in the direction of the arrows; and Figure 13 is a section taken on the line XIII—XIII of Figure 2 and looking in the direction of the arrows.

The embodiment of the invention shown in the drawings is designed to be mounted upon a conventional "stream-lined" automobile fender 15 having an approximately semicircular wheel access opening whose edge is indicated by the dotted line 16 in Figure 1. The edge of the fender along the bottom and around the wheel access opening 16 is bent in so as to form an inwardly projecting flange 17, 18, 19 in front of, around and in back of the wheel access opening 16.

The fender shield comprises a sheet metal panel 21 which is large enough to cover the entire wheel access opening 16 as shown in Figures 1 and 2. The lower edge of the panel 21 is approximately straight and is bent back to form a horizontal flange 22, to the upper side of which is secured a reinforcing bar 23. The remainder of the edge of the panel 21, at the ends and around the top, which lies against the side of the fender 11, is folded back, as shown in Figure 4 to form a thin U-shaped reinforcement 24. The reinforcement 24 not only serves to strengthen the edge of the panel but also serves, in connection with a stiff wire 25, to secure a rubber edging 26 which prevents metal-to-metal contact between the edge of the metal panel and the side of the fender. The main portion of the rubber edging 26, as shown in Figure 4, fits in under the inturned edge 24 on the panel 21 and is held in place by the wire 25 which bears against a suitable shoulder on the rubber edging 26. One end 27 of the wire 25 fits into a pocket formed by folding the ends of the flange 24 on the fender shield panel 21 in tightly against the back of the panel 21, and the other end 28 of the wire fits into a small socket 29 stamped into the end of the flange 22 along the lower edge of the fender shield panel 21. This construction is fully described and illustrated in the specification and drawings forming parts of my copending patent application entitled "Fender shield," Serial No. 269,651, filed April 24, 1939. The portion 31 of the rubber edging 26 which lies outside of the inturned flange 24 has the shape shown in Figure 4 when no pressure is applied thereto, and assumes the shape shown at the top of Figure 3 when it is pressed tightly against the side of the fender. This arrangement provides considerable latitude in how close the edge 24 of the fender shield panel 21 is to the side of the fender while still insuring an effective seal between them to prevent the passage of mud and dirt.

The bottom of the fender shield is provided with two hooks 32 and 33, by means of which the fender shield is connected to the inturned flange 17 and 19 in front of and behind the wheel access opening. These hooks fit against the edge of and rest on top of the two portions 17 and 19 of the fender flange and form pivots defining an axis about which the fender shield panel may be rocked into a position against the side of the fender. In mounting the fender shield, the fender shield is first held at an angle with its lower edge under the edge of the fender and the hooks 32 and 33 are hooked up onto the fender flange 17, 19. The fender shield is then swung up into a vertical position against the side of the fender and its top is secured by the latch 34 described in detail below.

The fender shield panel 21 may be shaped so that it will fit against the side of the fender 15 without being strained, but it has been found that a much tighter and better fit can be secured if the fender shield panel 21 is formed so that, before it is mounted on the fender, the edges at the front and rear are less convex than the side of the fender and the edge at the central portion of the top is more convex than the side of the fender. With the fender shield panel 21 shaped in this manner, it is found that, when the hooks 32 and 33 are hooked onto the flange 17, 19 at the bottom of the fender and the panel 21 is swung up into position against the side of the fender, a tight contact between the edge of the fender shield panel and the fender is first made at the ends of the fender shield near the bottom while the top of the panel is still spaced out from the side of the fender. As the top of the fender shield is pressed into position, the fender shield panel 21 is sprung or strained slightly and the distance along which the edge of the fender shield panel is in tight contact with the side of the fender extends up at each end of the fender shield until the entire edge of the fender shield panel is in tight contact. The latch 34 may then be swung up behind the flange 18 on the fender at the top of the wheel access opening to hold the fender shield in this position.

The hook 32 at the front of the fender shield is arranged so that it may be moved in and out slightly to adjust the fender shield to slightly different fenders. This arrangement (seen in plan in Figures 10 and 11) comprises a pressed steel arm 35, on one end of which the hook 32 is integrally formed and the other end of which is pivoted to the reinforcing bar 23 by means of a rivet 36. The rivet 36 is located a short distance in from the end of the reinforcing bar 23, so that the arm 35 and the reinforcing bar 23 overlap for a short distance. The overlapping portions of the pivoted arm 35 and the reinforcing bar 23 are provided with means for fixing them together in slightly different angular relation. These means may comprise a bolt passing through elongated holes in the two members 35 and 23 and by means of which they may be clamped together in different positions, but I have found it desirable to provide a means by which the arm 35 may be held positively in any of the positions that may be desirable. I have found that the particular embodiment of the invention shown in the drawings may be fitted very well to the fenders of the several different cars for which it is being sold if only two adjustments are provided for the arm 35 and the hook 32. These two positions of adjustment are provided by two square holes 37 and 38 (shown in Figures 10 and 11 respectively) in the reinforcing bar 23 and by two round holes 39 and 41 in the arm 35. The holes 39 and 41 in the movable arm 35 are at the same distance respectively from the rivet 36 as the holes 37 and 38 in the reinforcing bar 23 but, whereas the holes 37 and 38 in the reinforcing bar are in line with the rivet 36 which forms the pivot of the arm 35, the holes 39 and 41 in the arm 35 are slightly out of line with the rivet 36. Thus, if a bolt 42 is placed through one pair of holes 37 and 39, as shown in Figure 11, the arm 35 will be held in a slightly different angular position than if the bolt 42 is placed through the other pair of holes 38 and 41 as shown in Figure 10. The bolt 42 is of the type known as a carriage bolt having a portion of the shank immediately adjacent the head square in form so that it will fit in the square holes 37 and 38 and prevent the bolt from turning while the nut 43 is being tightened.

The arm 35 may be shaped so as to lie entirely behind the rearwardly projecting flange 17, 18 on the fender but I have found that a more economical construction is secured if the arm 35 extends under the flange 17 and that it will be sufficiently strong and rigid, even though made of sheet metal, if it is provided with a flange 44 along one of its longitudinal edges and projecting up behind the flange 17 on the fender. Although the arm 35, if constructed in this manner, may be seen from the outside of the fender when the fender shield is in place if the eye is level with the lower edge of the fender shield, it will be entirely unnoticeable to a person standing near the car if the outer edge 45 of the portion of the arm 35 lying below the fender flange 17 is shaped so as to set back a little from the face of the fender.

The hook 33 at the rear end of the fender shield is carried by a bracket 46 which projects in from under the flange 22 along the bottom of the fender shield panel 21 and which is fixed to the flange 22 and the reinforcing bar 23 by means of rivets 47. The hook 33 is provided with a base portion 48 which rests on top of and is secured by a bolt 49 to the bracket 46. The bolt 49 passes through a slot 51 in the bracket 46 so that the hook 33 may be located at various distances from the fender shield panel 21 in order to adapt the fender shield to different fenders.

In order to increase the adaptability of the fender shield to different fenders, it is desirable to provide means for changing the position of the hook 33 longitudinally of the fender shield. This is accomplished by making the base 48 of the hook 33 considerably wider than the bracket 46 and providing two holes 52 and 53 for the bolt 49, these holes being spaced apart in the direction of the length of the fender shield. The holes 52 and 53 may also be placed at different distances back from the hook 33 in order to provide a different range of in and out adjustment, depending upon whether the base 48 of the hook is bolted in place through one hole 52 or the other hole 53.

In order to lessen the possibility of the base 48 of the hook 33 sliding upon the bracket 46 and thus moving from its set position, the upper surface of the bracket 46 and the lower surface of the hook base 48 which fits against it are each formed with a series of ridges and grooves which fit into each other and prevent slipping or turning of the two members relative to each other. In addition, the two sides of the base 48 are bent down to form flanges 54, one or the other of which will be in contact with one side or the other of the bracket 46 when the hook base 48 is secured in one position or the other. (These flanges may be seen in Figure 2.)

The latch 34 is a dog-legged lever which is pivoted by a rivet 56 to the back of the sheet metal stay 57 on the back of the fender shield. The stay 57 is made channel shaped in cross section, as may be seen from Figure 6, and its lower end is flattened and bent out horizontally to form a foot 58 which rests on top of the reinforcing bar 23 and is secured to it and to the flange 22 on the bottom of the panel 21 by means of a pair of rivets 59.

The upper end of the stay 57 is provided with a generally flat shoe 61 which fits in under the flange 24 on the edge of the fender shield panel 21 and holds the upper end of the stay 57 in place. The shoe 61 is connected to the stay 57 by means of a stud 62 spot welded to the shoe 61 and extending down into a tube formed by a small stamping 63 spot welded to the face of the stay 57 at its upper end. The stud 62 is threaded but the tube 63 into which it fits is not threaded, thereby leaving the stud 62 free to slide vertically with respect to the stay 57 and tube 63. Positioning of the shoe 61 and stud 62 with respect to the stay 57 and tube 63 is accomplished by means of a pair of nuts 64 threaded onto the stud 62 above the end of the stay 57. The lower one of the two nuts 64 bears against the top of the stay 57 and tube 63 and forces the shoe 61 and stud 62 upward so that the shoe 61 is held in tight engagement with the edge of the fender shield panel 21. The upper one of the two nuts 64 serves as a lock nut.

The shoe 61, stay 57 and the parts 62, 63, 64 which connect them together, besides serving as a support for the latch lever 34, serve as a means of adjusting the curvature of the panel 21 and making it fit different fenders more accurately. If, after the fender shield is mounted on a fender, the upper edge of the panel fits closely against the fender immediately adjacent the shoe 61 but fits loosely at either or both sides of that point, the looseness can be eliminated by loosening the upper or lock nut 64 and turning both nuts 64 in a clockwise direction to force the shoe 61 up slightly with respect to the stay 57 and thereby increase the convexity of the central portion of the upper edge of the fender shield panel. If, on the contrary, the upper edge of the panel fits closely against the fender away from the shoe 61 but fits loosely immediately adjacent the shoe, the looseness can be eliminated by turning the nuts 64 in a counter-clockwise direction.

In order that the upper edge of the shoe 61 may bear directly against the inturned edge of the panel 21, the rubber edging 26 is provided with several notches 65, and the upper edge of the shoe 61 is formed into projections 66 which extend up through these notches and engage the panel 21. The portions of the rubber edging 26 between the notches 65 form lugs 67 which lie between the projections 66 on the shoe 61 and help to hold the rubber edging 26 in place. This additional support for the rubber edging 26 is desirable at this point because here the wire 25 is offset down out of supporting contact with the edging 26 in order to avoid interfering with the shoe 61.

The rotatable mounting of the stud 62 on the upper end of the stay 57 performs two important functions. It allows the upper edge of the fender shield panel 21 to fit itself more freely against the side of the fender than if the shoe 61 were rigidly secured to the stay 57, and it also allows the stay 57 to act as a torsion spring in resiliently holding the lower end 68 of the latch lever 34 pressed against the edge of the reinforcing bar 23.

The main portion of the latch lever 34 is channel shaped in cross section in order to increase its strength and stiffness, but the lower end 68 is flat in cross section and is formed with a pair of reverse bends 71 and 72 so that the portion between the bends may rest on top of the reinforcing bar 23. One corner 73 of the end 68 of the latch lever beyond the two bends 71 and 72 is bent so that it projects under the reinforcing bar 23 and the flange 22 on the bottom of the panel 21. Thus the end 68 of the latch lever 34 fits around under and over the bottom flange 22 on the panel and the reinforcing bar 23 and holds the latch lever 34 from being swung in either direction. A piece of thick fabric 74 is wrapped around and riveted to the end 68 of the lever where it rests against the edge of the reinforcing bar 23 to prevent rattling or squeaking.

The latch lever 34 itself has a certain amount of flexibility which contributes to making it easy for the end 68 of the lever to be sprung back far enough to allow the lever to be swung down behind the bottom flange 22 of the panel and the reinforcing bar 23, but this operation is also facilitated by the torsional resiliency of the stay 57. Since the upper end of the stay 57 is free to rotate on the stud 62 and the length of the stay from the pivot 56 of the latch lever 34 to the bottom of the stay where it is secured by the rivet 59 is considerable, the upper end of the stay 57 carrying the latch lever 34 can twist to some extent about a vertical axis, the twisting, of course, being resisted only by the torsional stiffness of the stay. If the stay 57 is an open channel section rather than a closed section such as a box, the torsional stiffness of the stay is not great and it is relatively easy to spring the end 65 of the latch lever 34 out of engagement with the flange 22 and reinforcing bar 23 along the lower edge of the panel. The lower end of the latch lever 34 can then be swung forward, whereupon the upper end will swing back and down, thereby releasing the upper portion of the fender shield.

While I have shown only one particular embodiment of my invention, it will of course be understood that I do not wish to be limited thereto, since many modifications may be made, and I therefore contemplate by the appended claims to cover all such modifications as fall within the true spirit and scope of my invention.

I claim as my invention:

1. In a fender shield comprising a panel having an inturned lower edge adapted to cover the wheel access opening in a fender having an inturned lower edge, means for supporting said fender shield on said fender, including an arm pivotally connected to said inturned lower edge of said panel at one end and having the other end formed into a hook adapted to fit around behind and over said fender inturned lower edge, said arms being pivotally movable about substantially a vertical axis, and means for fixing said arm to said panel in different angular positions.

2. In a fender shield comprising a panel adapted to cover the wheel access opening in a fender having an inturned lower edge, said panel having a horizontal flange near its lower edge, means for supporting said fender shield on said fender including an arm pivotally mounted on said flange at one end and having the other end formed into a hook adapted to fit around behind and over said inturned lower edge, said flange and said arm having a plurality of pairs of holes and different pairs of said holes being adapted to be in registry when said arm is in different angular positions, and a bolt adapted to fit into any one of said pairs of holes to hold said arm in any one of said different angular positions.

3. In a fender shield comprising a panel adapted to cover the wheel access opening in a fender having an inturned lower edge, said panel having a horizontal inwardly projecting flange along its lower edge, means for supporting said fender shield on said fender including a sheet metal arm pivotally secured on top of said flange at one end, said arm having the portion extending beyond the end of said flange offset below the plane of said flange and adapted to extend under the edge of said fender beyond said wheel access opening and terminating in a hook portion adapted to fit up behind and over said inturned lower edge on said fender, said arm being provided with a strengthening flange extending up from the edge thereof away from said panel and adapted to lie behind said inturned lower edge on said fender, and means for fixing said hook to said panel in different angular positions.

4. In a fender shield comprising a panel adapted to cover the wheel access opening in a fender having an inturned lower edge, means for supporting said fender shield on said fender including a supporting member having an end portion adapted to rest on top of said inturned lower edge beyond said wheel access opening and adjustable means for securing said supporting member to said panel with said end portion selectively positioned at any one of a plurality of different distances from the plane of said panel.

5. In a fender shield comprising a panel adapted to cover the wheel access opening in a fender having an inturned lower edge extending around said opening and along the bottom of said fender at each side of said opening, means for supporting said fender shield on said fender including a supporting arm fixed to said panel and projecting beyond one end thereof, said supporting arm being formed of sheet metal and having a portion adapted to extend under the inturned lower edge of said fender beyond said wheel access opening and having a flange portion adapted to extend up behind said inturned lower edge, and a hook projecting from said flange towards the plane of said panel and adapted to engage the upper surface of said underturned edge of said fender.

6. In a fender shield comprising a panel adapted to cover the wheel access opening in a fender having an inturned lower edge extending along the bottom of the fender on at least one side of said opening, means for supporting said panel on said fender including a bracket projecting back from and secured to said panel, said bracket being adapted to project under and beyond said inturned lower edge, and a hook having a base portion bolted on top of said bracket and a hook portion on the edge of said base portion toward said panel, said hook portion being adapted to engage the edge and top of said inturned lower edge of said fender.

7. In a fender shield comprising a panel adapted to cover the wheel access opening in a fender having an inturned lower edge extending along the bottom of the fender on at least one side of said opening, means for supporting said panel on said fender including a bracket projecting back from and secured to said panel, said bracket being adapted to project under and beyond said inturned lower edge and having its upper surface provided with parallel ridges and grooves, and a hook having a base portion and a hook portion, said base portion being bolted on top of said bracket and having parallel ridges and grooves interfitting with the ridges and grooves on said bracket, and said hook portion extending toward said panel from said base portion and being adapted to engage the edge and top of said inturned lower edge of said fender.

8. In a fender shield comprising a panel adapted to cover the wheel access opening in a fender having an inturned lower edge extending along the bottom of the fender on at least one side of said opening, means for supporting said panel on said fender including a bracket projecting back from and secured to said panel, said bracket being adapted to project under and beyond said inturned lower edge, a hook having a base portion resting on top of said bracket and a hook portion extending from said base portion toward said panel, said hook portion being adapted to engage the edge and top of said inturned lower edge of said fender, and a bolt extending through holes in said bracket and the base of said hook for securing them together, at least one of said holes being elongated whereby the position of said hook relative to said bracket may be adjusted.

9. In a fender shield comprising a panel adapted to cover the wheel access opening in a fender having an inturned lower edge extending along the bottom of the fender on at least one side of said opening, means for supporting said panel on said fender including a bracket projecting back from and secured to said panel, a hook for engaging said inturned lower edge and having a base fitting on top of said bracket, and a bolt extending through holes in said base and said bracket for securing said hook to said bracket, at least one of said members secured together by said bolt having a plurality of holes for said bolt whereby said hook may be secured to said bracket in any one of a plurality of positions.

GEORGE W. SCHATZMAN.